United States Patent [19]
Fuse

[11] Patent Number: 5,443,274
[45] Date of Patent: Aug. 22, 1995

[54] NON-CONTACT MECHANICAL SEAL

[75] Inventor: Toshihiko Fuse, Hyogo, Japan

[73] Assignee: Nippon Pillar Packing Co., Ltd., Osaka, Japan

[21] Appl. No.: 4,583

[22] Filed: Jan. 14, 1993

[30] Foreign Application Priority Data

Sep. 3, 1992 [JP] Japan .................. 4-062097 U

[51] Int. Cl.$^6$ .................................................. F16J 15/34
[52] U.S. Cl. .......................................... 277/38; 277/41; 277/81 R; 277/82
[58] Field of Search ................ 277/38, 39, 40, 41, 277/81 R, 82, 83, 85, 96.1, 92

[56] References Cited

U.S. PATENT DOCUMENTS

| | | | |
|---|---|---|---|
| 3,582,090 | 6/1971 | Lott | 277/81 P |
| 3,715,169 | 2/1973 | Molis | 277/81 R |
| 4,406,466 | 9/1983 | Geary, Jr. | 277/96.1 |
| 4,586,719 | 5/1986 | Marsi et al. | 277/41 |
| 4,625,977 | 12/1986 | Azibert et al. | 277/82 |
| 4,768,790 | 9/1988 | Netzel et al. | 277/81 R |
| 5,026,076 | 6/1991 | Back | 277/27 |

FOREIGN PATENT DOCUMENTS

3036700  5/1982  Germany .................. 277/27

Primary Examiner—Daniel G. DePumpo
Attorney, Agent, or Firm—Griffin, Butler, Whisenhunt & Kurtossy

[57] ABSTRACT

A stationary sealing ring (6) surrounds a rotatable shaft (2) and is fitted to, and held by, a cylindrical guide (1a) of a seal case (1). An extremely small clearance is provided between the outer peripheral surface (6b) of the stationary sealing ring and the inner peripheral surface (1c) of the guide. This small clearance prevents radial displacement of the ring but allows the ring to move in the axial direction and permits the passage of a fluid. Because the sealing ring is held without the use of a holding ring or an O-ring, the concentricity and parallelism of the stationary sealing ring to a rotary sealing ring (3) can be continuously maintained despite pressure fluctuations. Clearance between the stationary sealing ring and a holding ring (4) is maintained by an O-ring (9) held in an annular dovetail groove (10) formed in a surface (4c) of the holding ring facing the stationary sealing ring. The O-ring serves as a strain isolator which prevents the transmission of thermal and pressure strains between the holding ring and the stationary sealing ring.

1 Claim, 3 Drawing Sheets

NON-CONTACT MECHANICAL SEAL

FIELD OF THE INVENTION

This invention relates to non-contact mechanical seals of a type used in turbines, blowers, centrifugal compressors and other rotating equipment handling fluids including gaseous fluids such as nitrogen, hydrogen, argon, natural gas, air, and so forth.

BACKGROUND OF THE INVENTION

Conventional non-contact mechanical seals for rotating equipment have generally comprised a rotary sealing ring fixed to a rotating shaft which penetrates a seal case. A holding ring is held movably against the seal case via an O-ring so that the ring may move axially but is free from radial displacement. A stationary sealing ring is fitted on the holding ring by shrink fitting it in an inner hole. Springs are mounted between the seal case and holding ring to bias the stationary sealing ring against the rotary sealing ring via the holding ring. A dynamic pressure generating groove is provided on the rotating side sealed end face to maintain a fluid film in the region between the sealing surfaces thereby sealing a high-pressure fluid zone from a low-pressure (atmospheric) fluid zone.

A conventional seal as described above exhibits certain deficiencies. The rotary sealing ring, the stationary sealing ring and the holding ring are constructed with dissimilar materials with varying thermal expansion coefficients and Young's moduli. For example, the rotary sealing ring is made from extra hard material such as WC, SiC, etc., the stationary sealing ring from comparatively soft materials such as carbon, etc., and the holding ring from metallic materials such as SUS304, Ti, etc. Thermal and pressure strains are produced in the rotary sealing ring, stationary sealing ring, and holding ring by heat generated by operation or system pressure of the equipment. These strains and conditions vary depending on the differences between component materials. In particular, the strain in the holding ring is extremely large due to the component materials. Consequently, in the conventional seal in which the stationary sealing ring is fitted and integrated into the holding ring, the strains interfere with each other at the portion in which the stationary sealing ring comes in contact with the holding ring. Therefore, the stationary sealing ring is strongly subjected to the strain of the holding ring and exhibits a strain condition completely different from its own strain.

Moreover, effectively holding the stationary sealing ring radially in relation to the seal case primarily by the O-ring, which is an elastic member located between the seal case and the holding ring, can result in serious instability and it is possible to displace the stationary sealing ring in the radial direction by pressure fluctuations etc. These factors impair smoothness of the stationary side sealing end face as well as its concentricity and parallelism in relation to the rotating side sealing end face. This results in non-uniformity of the dynamic pressure generated between the sealed end faces and, in an extreme case, gives rise to contingencies such as defective generation of dynamic pressure or localized contact of sealed end faces, and raises problems in that the seals do not exhibit good sealing capabilities over a long period of time.

BRIEF DESCRIPTION OF THE INVENTION

An object of the present invention is to provide a non-contact type mechanical seal which can properly maintain smoothness of the sealing end face at the stationary sealing ring as well as concentricity and parallelism to the rotary-side sealing end face.

A further object of the invention is to provide a non-contact seal which exhibits satisfactory sealing capabilities over a long period of time even under high-pressure and/or high-speed conditions.

The above and other objects are achieved by fitting and holding the stationary sealing ring to the seal case movably in the axial direction while keeping the stationary sealing ring free from radial displacement and by maintaining the stationary sealing ring and the holding ring in the sealed non-contact condition by an O-ring located between opposite surfaces opposing in the axial direction. In one preferred embodiment, an outer peripheral surface of the stationary sealing ring is fitted to an inner peripheral surface of a cylindrical guide formed on the seal case or the inner peripheral surface of the stationary sealing ring is fitted to the outer peripheral surface of a cylindrical guide formed in the seal case. An extremely small clearance is formed between the fitted surfaces to permit the axial movement of the ring and to allow fluid to pass, but prevent radial displacement of the stationary sealing ring. More specifically, it is desirable to keep the difference between the outside diameter of the stationary sealing ring and the inside diameter of the guide section for the former case and the difference between the inside diameter of the stationary sealing ring and the outer diameter of the guide section for the latter case, to 10–100 μm. In another preferred embodiment, an annular dovetail groove is formed on the end face of the holding ring opposite to the stationary sealing ring and in this annular groove an O-ring is fitted and held slightly extruded toward the stationary sealing ring. The stationary sealing ring and the holding ring are thus held strongly pressed by the springs and fluid pressure. The pressing force is applied through an elastic material, the O-ring, and not through direct contact between the two rings. Consequently, because in the pressed section of both rings, strain of each ring is absorbed by the O-ring and does not interfere with the strain of the counterpart ring, the strain distribution of the stationary sealing ring is not affected by the strain of the holding ring even though the thermal and pressure strain rates of the rings may differ. Moreover, because the stationary sealing ring is held directly to the seal case without interposition of the holding ring or O-ring, its concentricity and parallelism to the rotary sealing ring can be constantly and properly maintained.

The gap between the stationary sealing ring and the holding ring is satisfactorily sealed by the O-ring. Because the pressing force by the springs is transferred from the holding ring to the stationary sealing ring via the O-ring, the pressing force of the stationary sealing ring to the rotary sealing ring is properly maintained and has no detrimental effect on the sealing capabilities. In addition, the use of a dovetail groove as the annular groove to hold the O-ring eliminates any fear of the O-ring dislodging from the annular groove as the equipment is assembled, or vibration is generated during operation, or pressure fluctuates.

DETAILED DESCRIPTION OF THE INVENTION

Figure 1:
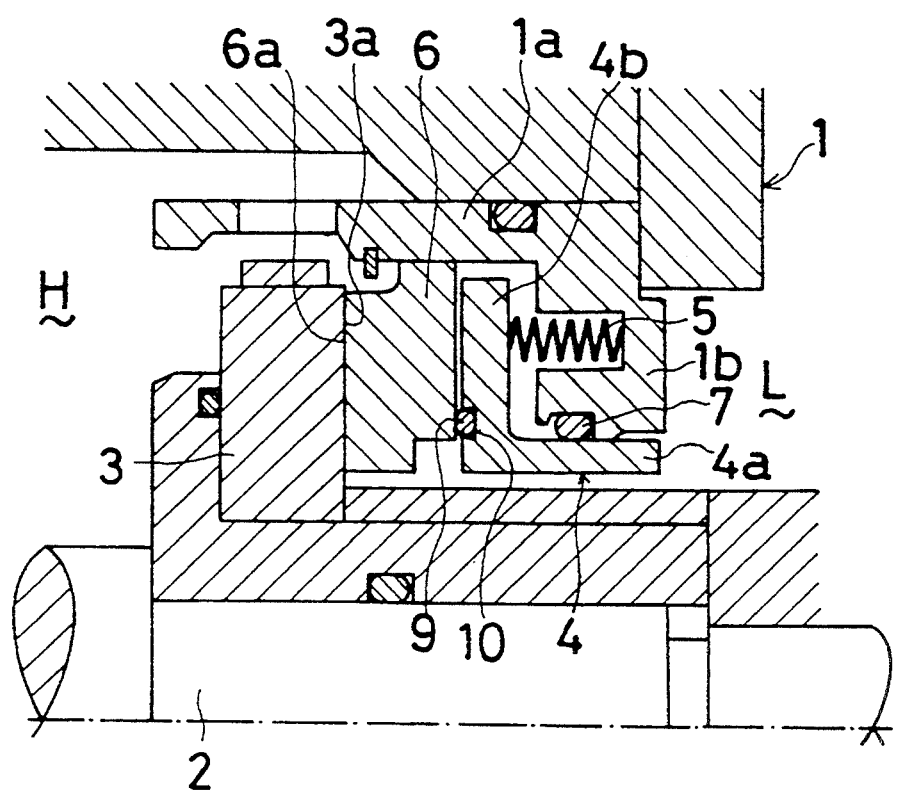
FIG. 1 is a part sectional view showing one embodiment of a non-contact type mechanical seal according to this invention.
Figure 2:
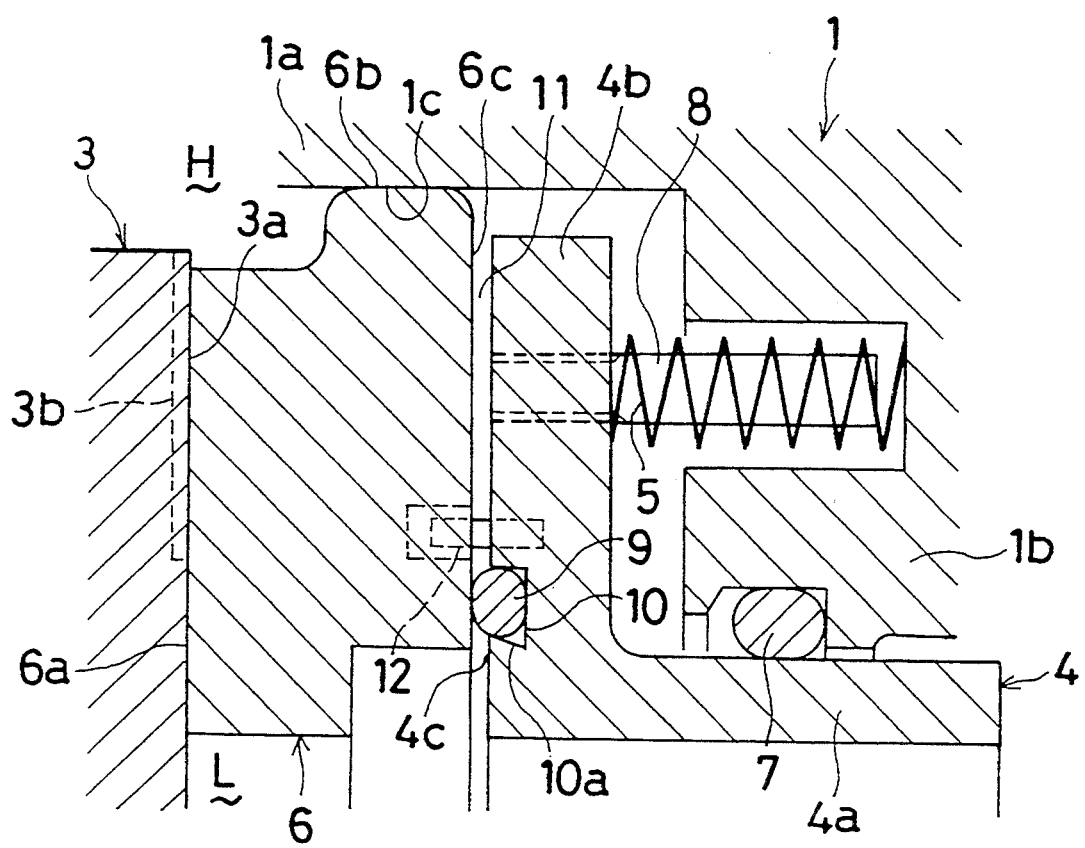
FIG. 2 is a sectional view on an enlarged scale showing a principal portion of FIG. 1; and, FIG. 3 is a part section view of a second embodiment of the invention.

As illustrated in FIGS. 1 and 2, a first embodiment of a non-contact mechanical seal constructed in accordance with the principles of the present invention comprises a rotary sealing ring 3 fixed to a rotating turbine or other shaft 2 which passes through a seal case 1. A holding ring 4 is held to the seal case 1 and a plurality of springs 5 are located between the seal case 1 and the holding ring 4. A stationary sealing ring 6 is arranged opposite to the rotary sealing ring 3.

The seal case 1 has a cylindrical guide 1a and an annular retainer 1b and the rotating shaft 2 concentrically passes through the guide 1a and retainer 1b.

The rotary sealing ring 3 is made of extra hard material such as WC, SiC, etc. A dynamic pressure generating groove 3b (FIG. 2) making a proper form such as spirals, etc. is formed on the end face 3a of the rotary sealing ring 6. Dynamic pressure is generated by groove 3b as sealing rings 3 or 6 rotate in relation to each other. This pressure creates a fluid film between the end faces 3a, 6a which holds the sealing rings 3, 6 apart in the non-contact condition. With this fluid film section, the gap between the high-pressure side sealing fluid zone H (i.e. high-pressure gas region which is inside the machine) and the low-pressure side sealing fluid zone L (i.e. atmospheric region outside the machine) is sealed.

The holding ring 4 is made of metallic material such as SUS304, Ti, etc. and is formed to have an L-shaped cross-section having a cylindrical "held" section 4a and an annular flange or "pressed" section 4b, as shown in FIG. 1. The holding ring 4 is held so as to be movable in the axial direction but free from radial displacement. The gap between the seal case 1 and the holding ring 4 is double-sealed by having the "held" section 4a fitted into and held to the inner peripheral section of the retainer 1b via a first O-ring 7, as shown in FIG. 2. The holding ring 4 is prevented from rotating in relation to the seal case 1 by providing a plurality of locking pins 8 set on the ring to latch the retainer 1b of the seal case 1.

The springs 5 are mounted between the retainer 1b of the seal case 1 and the "pressed" section 4b of the holding ring 4, as shown in FIGS. 1 and 2. These springs press and bias or charge the holding ring 4 toward the rotary sealing ring 3 in the axial direction.

The stationary sealing ring 6 is made of a comparatively soft material such as carbon, etc. and, as shown in FIGS. 1 and 2, is fitted into and held to the guide 1a of the seal case 1 so as to be movable in the axial direction and free from movement in the radial direction. That is, the stationary sealing ring 6 is fitted to the guide 1a with dimensional tolerances of a clearance fit level (JIS-B0401, ISO/R 286), and between the outer peripheral surface 6b of the stationary sealing ring 6 and the inner peripheral surface 1c of the guide 1a, an extremely small clearance is formed, which prevents radial displacement of the stationary sealing ring 6 but permits axial movement and fluid passage. This clearance is properly set in accordance with the diameter of the stationary sealing ring 6 and sealing conditions but, in general, it is desirable to keep the difference between the outside diameter of the stationary sealing ring 6 and the inside diameter of the guide 1a in the range of about 10–100 $\mu$m. In addition, the gap between the stationary sealing ring 6 and the holding ring 4 is sealed and the rings kept in the non-contact condition by an O-ring 9 located between opposite end faces 4c and 6c of rings 4 and 6.

The forming of an annular groove 10 at the end face 4c of the pressed section 4b of the holding ring 4 and the fitting and holding of the second O-ring 9 slightly extruded from the annular groove 10, combined with the charging action of the springs 5, enables the stationary sealing ring 6 to keep charged and be pressed against the rotary sealing ring 3 under the sealing condition with a suitable clearance 11 being kept between ring 6 and the holding ring 4. The annular groove 10 is formed in a dovetail shape with only the inner peripheral side 10a tapered as shown in FIG. 2. This prevents the O-ring 9 from coming out of the annular groove 10 as the equipment is assembled, or because of vibration or pressure fluctuations during operation. Also, the diameter of the annular groove 10 (more accurately, the diameter of the sealing point by O-ring 9) must be designed to be suitably larger than the outside diameter of the held section 4a of the holding ring 4 (more accurately, the diameter of the sealing point by O-ring 7).

The stationary sealing ring 6 is prevented from rotating in relation to the holding ring 4 by providing a suitable number of locking pins 12 set into the "pressed" section 4b of the holding ring 4 to latch the stationary sealing ring. It is possible to use locking pins 8, 12 in common. That is, the locking pins 8 may be extended and the extended ends allowed to latch the stationary sealing ring 6.

In the non-contact type mechanical seal configured as shown in FIG. 1, the stationary sealing ring 6 does not come in direct contact with the holding ring 4 and they are held squeezed toward each other but separated by the second O-ring 9. Therefore thermal and pressure strains of rings 4 and 6 are absorbed by the elastic materials of the O-ring 9, and do not interfere with each other. That is, the strain distribution of the stationary sealing ring 6 is not affected by strains in the holding ring 4. Moreover, since the stationary sealing ring 6 is fitted and held to the guide 1a of the seal case 1 so as to be movable in the axial direction but free from radial displacement, concentricity and parallelism of the stationary side sealing end face 6a in relation to the rotary side sealing end face 3a are not impaired by pressure changes, etc. However, because the holding ring 4 is unstably held to the seal case 1 by the elastic material of O-ring 7, the holding ring 4 may be deviated in the radial direction due to pressure fluctuations, etc. This displacement of the holding ring 4 does not affect the stationary sealing ring 6 because the holding ring 4 and the stationary sealing ring 6 push each other only in the axial direction via the second O-ring 9 and are of a relation completely free from relative motion in the radial direction. Consequently, the smoothness of the stationary sealing end face 6a and the concentricity and parallelism of the face 6a in relation to the rotary-side sealing end face 3a are never impaired and satisfactory sealing capabilities are exhibited over a long period of time even under high-pressure and high-speed conditions.

Because the holding ring 4 does not come in direct contact with the stationary sealing ring 6 but they are held in the condition to push each other via the second O-ring 9, the gap between the two rings 4, 6 is reliably sealed via the second O-ring 9. Even if deflection of the rotating shaft 2 or trailing of stationary-side sealing elements 4, 6 occurs, axial displacement of the stationary-side sealing elements 4, 6 accompanying this is absorbed and counteracted by the first O-ring 7, preventing application of a load to the second O-ring 9. Consequently, the capability of absorbing the holding ring strain exhibited by the second O-ring 9 is not affected by deflection of the shaft.

The non-contact type mechanical seal of this invention is not limited to the above embodiment and may be improved and altered as required without deviating from the basic principle of the invention. For example, the radial position at which the second O-ring 9 is located or the clearance 11 between the two rings 4, 6 can be properly set in consideration of various conditions, for instance, the shape of the component parts, fluid pressures, and the like. In particular, the radial position of the second ring 9 is determined in consideration of the function of ring 6 to absorb the holding ring strain and its function to press the rotary sealing ring 3 via the holding ring 4. The means for generating dynamic pressure between the sealing end faces 3a and 6a is also optional.

Figure 3:
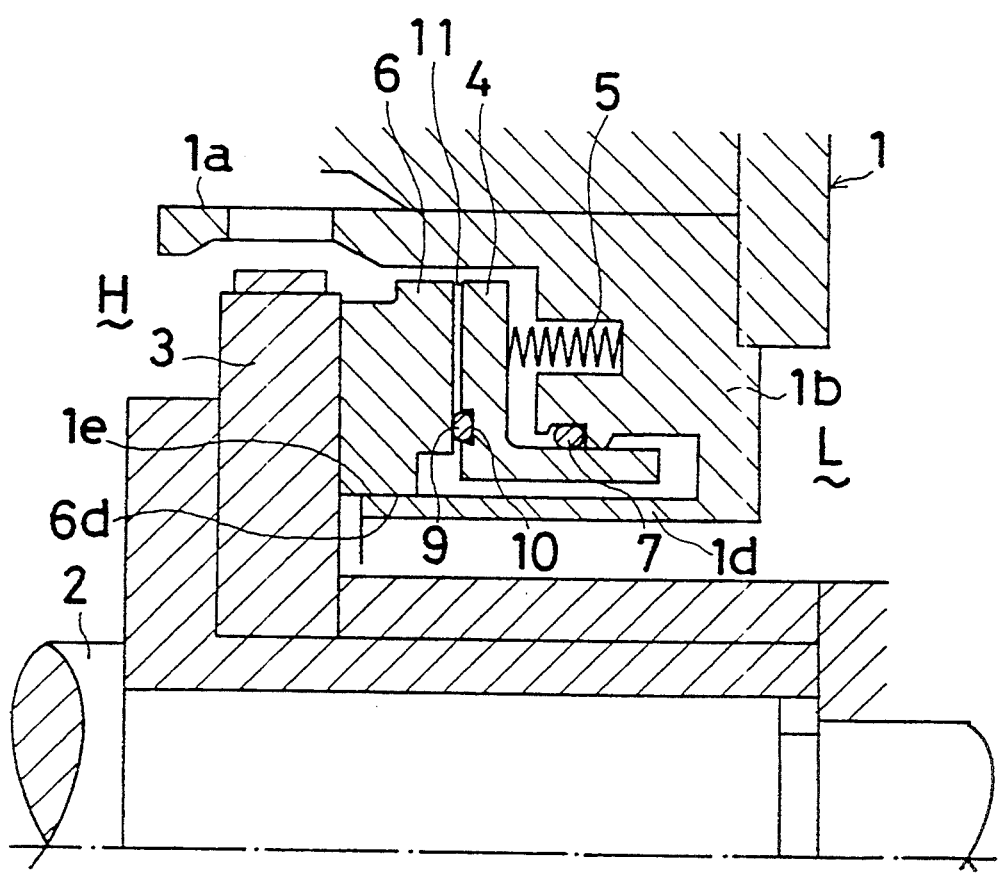

FIG. 3 illustrates an embodiment wherein the stationary sealing ring 6 is held to the sealing case 1 in such a manner as to allow movement in the axial direction but prevent displacement in the radial direction. The sealed case 1 is provided with a cylindrical guide section 1d, which extends from retainer section 1b through the holding ring 4 to the inner peripheral section of the stationary sealing ring 6. The inner peripheral surface 6d of the stationary sealing ring 6 is fitted to the outer peripheral surface 1e of the guide section 1d. The stationary sealing ring 6 is fitted to the guide section 1d with dimensional tolerances (JIS-B0401, ISO/R 286) of about clearance fit, while between the inner peripheral surface 6d of the stationary sealing ring 6 and the outer peripheral surface 1e, an extremely small clearance is provided which prevents radial displacement of the stationary sealing ring but allows axial movement and passage of the fluid. Needless to say, as in the first described embodiment, it is desirable to design the clearance in accordance with the diameter of stationary sealing ring 6 and sealing conditions. In general, it is desirable to keep the difference between the inside diameter of the stationary sealing ring 6 and the outside diameter of the guide section 1d in the range of about 10–100 μm.

I claim:

1. A non-contact type mechanical seal comprising a rotary sealing ring fixed to a rotary shaft, a holding ring held movably in the axial direction to a seal case, springs mounted between said seal case and said holding ring, and a stationary sealing ring pressed and charged against said rotary sealing ring via said holding ring by said springs and means for generating dynamic pressure between opposite end faces of said rotary and stationary sealing rings, an outer peripheral surface of the stationary sealing ring being fitted to an inner peripheral surface of a cylindrical guide formed on said seal case so that an extremely small clearance is formed between said fitted outer and inner peripheral surfaces to prevent radial displacement of said stationary sealing ring but permit axial movement and fluid passage, and said stationary sealing ring and said holding ring being held sealed but free from contact in the axial direction by an O-ring positioned between opposing surfaces of said stationary sealing ring and said holding ring, wherein the difference between the outside diameter of the stationary sealing ring and the inside diameter of the guide is 10–100 μm.

* * * * *